F. H. D. BERGMANN.
NON-REMOVABLE SECURING MEMBER.
APPLICATION FILED APR. 29, 1918.
1,321,796.
Patented Nov. 11, 1919.
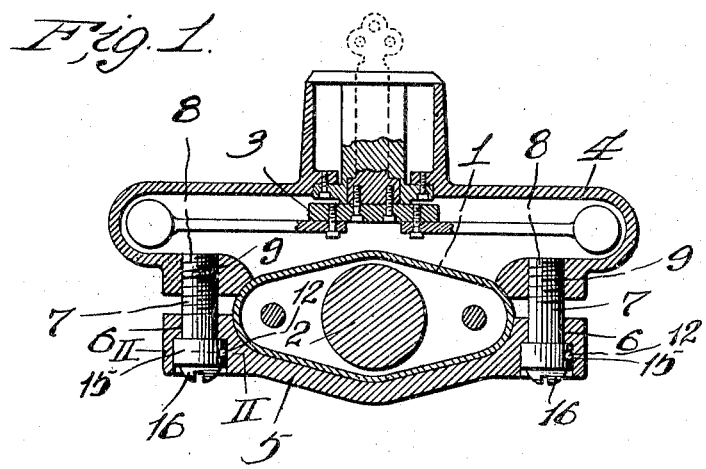
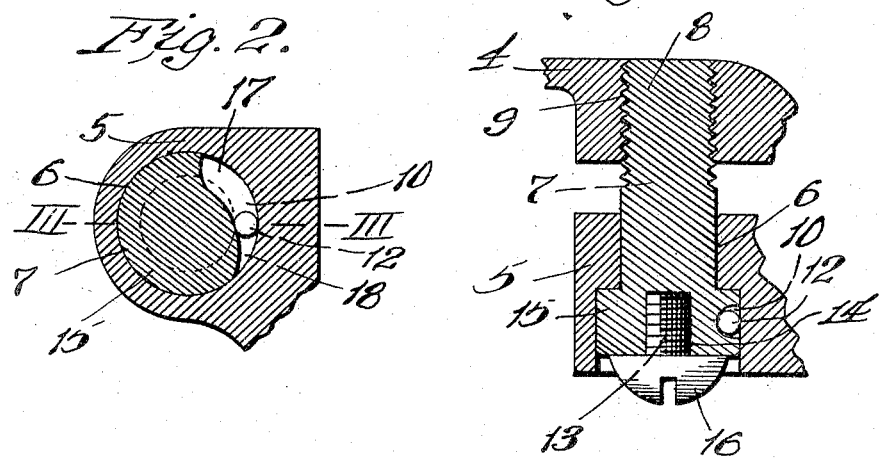
Inventor:
Frederich H. D. Bergmann.
By H. G. Fletcher
atty.

UNITED STATES PATENT OFFICE.

FREDERICH H. D. BERGMANN, OF ST. LOUIS, MISSOURI.

NON-REMOVABLE SECURING MEMBER.

1,321,796. Specification of Letters Patent. Patented Nov. 11, 1919.

Application filed April 29, 1918. Serial No. 231,322.

*To all whom it may concern:*

Be it known that I, FREDERICH H. D. BERGMANN, a citizen of the United States of America, and a resident of the city of St. Louis and State of Missouri, have invented certain new and useful Improvements in Non-Removable Securing Members, of which the following is a specification.

The primary object of this invention is to provide an improvement in a cap screw or the like, so that when it is mounted in a securing position, the same cannot be removed.

Another object is to provide an improvement in a cap screw, in which the driving portion thereof will become non-active on the cap screw when an attempt is made to remove the cap screw from a secured position.

Other and further objects will appear in the specification and be specifically pointed out in the appended claims, reference being had to the accompanying drawings exemplifying the invention, and in which, Figure 1 is a transverse section taken through a locking element which is clamped to a steering shaft support, said locking element being non-removably secured to the support by a pair of these improved non-removable cap screws.

Fig. 2 is an enlarged fragmentary cross section taken on the line II—II of Fig. 1.

Fig. 3 is an enlarged fragmentary horizontal section taken on the line III—III of Fig. 2.

As shown in the drawings, 1 designates a steering shaft support, in which is mounted an automobile steering shaft 2, and mounted against said support 1 is a locking element 3 which is adapted to lock operative parts located adjacent the steering wheel of an automobile, not shown.

The aforementioned locking element mounted against the steering shaft support 1 is merely illustrative regarding this invention as showing a device that should be non-removably mounted in order to properly carry out the work of being a locking element.

Inclosing the locking element 3 is a housing 4, and oppositely disposed from said housing and adapted to engage the opposite side of the steering shaft support 1 is a clamping plate 5, said clamping plate having a pair of cap screw openings 6 formed therein, each being for the reception of a cap screw 7, the threaded ends 8 of said cap screws being engaged in the threaded openings 9 formed in the housing 4. These cap screws 7 are made special so as to provide them being non-removably mounted relative to the clamping plate 5 and housing 4.

In this connection, each cap screw 7 has a recess 10 formed in the head 15 thereof, and there being a ball 12 mounted in each recess. For driving each cap screw 7 in a secured position, a small screw 13 is mounted in the threaded opening 14, which is formed in the head 15 of each screw 7, said screws 13 each having the usual slotted head 16.

In mounting the cap screws 7 in securing positions, said cap screws are mounted in their respective openings 6 of the clamping plate 5, and the screw driver is engaged in the slotted heads 16 of the screws 13 of the respective screws 7, and as said screws 7 are turned to the right, each of course having right hand threads, the threaded ends 8 thereof will be engaged in their respective threaded openings 9 of the housing 4. Each ball 12 is mounted in its respective recess 10 as the head portion of the screw is being introduced into its respective threaded opening 6. As each screw 7 is being turned in a right hand driving direction, the ball contained in the recess thereof will rest in the deeper portion 17 of the recess 10, thereby giving free movement to the screw as the ball will ride in the deeper portion of the recess without any binding interference with the wall of the opening 6.

After each screw 7 has been mounted in a securing position relative to clamping the plate 5 against the steering shaft support 1, and incidentally clamping the housing 4 of the locking element 3 against said support, said screws are therefore secured in a position of being non-removably mounted so that the locking element cannot be removed from the support 1.

In as much as the threads of the cap screws 7 are right hand, and the driving screws 13 thereof are also right hand threaded, it is to be noted that if an attempt is made to remove the cap screws 7 from their secured positions by engagement of a screw driver in the slotted heads 16 of the driving screws 13, said driving screws 13 will be run back on their threads on account of the left hand turn given to the screw driver, thereby producing no unloosening effect to the cap screws 7.

If in addition to the loosening of the driving screws 13 relative to running back the cap screws 7, a non authorized person attempts to drive said cap screws rearwardly by using a cold chisel or punch on the heads 15 of the cap screws, the balls 12 of each screw will travel into the shallower portion 18 of its respective recess 10, thereby jamming the ball against the wall of its respective opening 6.

What I claim is:

1. A non-removable securing member comprising a threaded body portion, and driving means for said body portion comprising a threaded member mounted in said body portion, said threaded body portion having a recess formed therein containing a wedging member.

2. A non-removable securing member comprising a threaded body portion, and a driving screw mounted in one end of said body portion, said screw providing driving means for said body portion, a wedging member coöperable with said body portion, said wedging member providing means for allowing said screw to be removed from said body portion.

3. A non-removable securing member comprising a threaded body portion having a shoulder formed thereon, driving means for driving said body portion, and a wedging element coöperable with said shoulder of said body portion.

4. A non-removable securing member comprising a body portion threaded adjacent one end, and having a head formed adjacent its opposite end, said head of said body portion bearing a recess in which is contained a wedging member.

FREDERICH H. D. BERGMANN.

Copies of this patent may be obtained for five cents each, by addressing the "Commissioner of Patents, Washington, D. C."